(12) United States Patent
Rogers et al.

(10) Patent No.: US 9,097,566 B2
(45) Date of Patent: Aug. 4, 2015

(54) MAGNETIC CORE CONFIGURATION FOR MAGNETIC FLOWMETERS

(71) Applicant: Rosemount Inc., Chanhassen, MN (US)

(72) Inventors: Steven Bruce Rogers, Minnetonka, MN (US); Michael John Mayer, Waconia, MN (US); Samuel Ethan Messenger, Chaska, MN (US); Michael Jeffrey Mikolichek, Farmington, MN (US)

(73) Assignee: Rosemount Inc., Chanhassen, MN (US)

( * ) Notice: Subject to any disclaimer, the term of this patent is extended or adjusted under 35 U.S.C. 154(b) by 63 days.

(21) Appl. No.: 14/038,296

(22) Filed: Sep. 26, 2013

(65) Prior Publication Data

US 2015/0082908 A1  Mar. 26, 2015

(51) Int. Cl.
G01F 1/58 (2006.01)
(52) U.S. Cl.
CPC ........................................ *G01F 1/58* (2013.01)
(58) Field of Classification Search
CPC ........................................................ G01F 1/58
USPC .......................................... 73/861.12, 861.13
See application file for complete search history.

(56) References Cited

U.S. PATENT DOCUMENTS

| 4,098,118 | A | | 7/1978 | Schmoock | |
|---|---|---|---|---|---|
| 4,454,766 | A | | 6/1984 | Reinhold et al. | |
| 4,825,703 | A | * | 5/1989 | Kubota | 73/861.12 |
| 5,540,103 | A | | 7/1996 | Zingg | |
| 6,085,599 | A | * | 7/2000 | Feller | 73/861.13 |
| 6,463,807 | B1 | * | 10/2002 | Feller | 73/861.12 |

FOREIGN PATENT DOCUMENTS

| DE | 10 2007 004826 | 8/2008 |
|---|---|---|
| DE | 10 2009 001413 | 9/2010 |
| EP | 0 418 033 B1 | 12/1994 |
| WO | WO 2013/010715 | 1/2013 |

OTHER PUBLICATIONS

Notification of Transmittal of the International Search Report and the Written Opinion of the International Searching Authority, or the Declaration for PCT Application No. PCT/US2014/052464, dated Nov. 17, 2014.
Rosemount E-Series Magnetic Flowmeters. Brochure. 7 pgs. Dec. 2010.

* cited by examiner

*Primary Examiner* — Jewel V Thompson
(74) *Attorney, Agent, or Firm* — Westman, Champlin & Koehler, P.A.

(57) ABSTRACT

A flowtube assembly for a magnetic flowmeter is provided. The flowtube assembly includes a flowtube configured to receive a flow of process fluid therethrough. A magnetic core is mounted relative to the flowtube and includes a stem extending from the flowtube to a pair of arms. Each of the arms extends away from the stem. A spool having a plurality of magnetic windings is disposed about the stem and spaces the plurality of windings from the flowtube.

17 Claims, 4 Drawing Sheets

MAGNETIC CORE CONFIGURATION FOR MAGNETIC FLOWMETERS

BACKGROUND

Magnetic flow meters are known and typically utilize an electrically insulated flowtube that carries a flow of process fluid past a coil of an electromagnet and past a pair of electrodes. The electromagnet applies an electromagnetic field to the flowing process fluid. Due to Faraday's Law of electromagnetic induction, a voltage or Electromotive Force (EMF) is generated between the pair of electrodes disposed in the process fluid. This voltage is a function of the strength of the applied magnetic field and is proportional to the fluid's rate of flow.

SUMMARY

A flowtube assembly for a magnetic flowmeter is provided. The flowtube assembly includes a flowtube configured to receive a flow of process fluid therethrough. A magnetic core is mounted relative to the flowtube and includes a stem extending from the flowtube to a pair of arms. Each of the arms extends away from the stem. A spool having a plurality of magnetic windings is disposed about the stem and spaces the plurality of windings from the flowtube.

DETAILED DESCRIPTION OF ILLUSTRATIVE EMBODIMENTS

Figure 1:
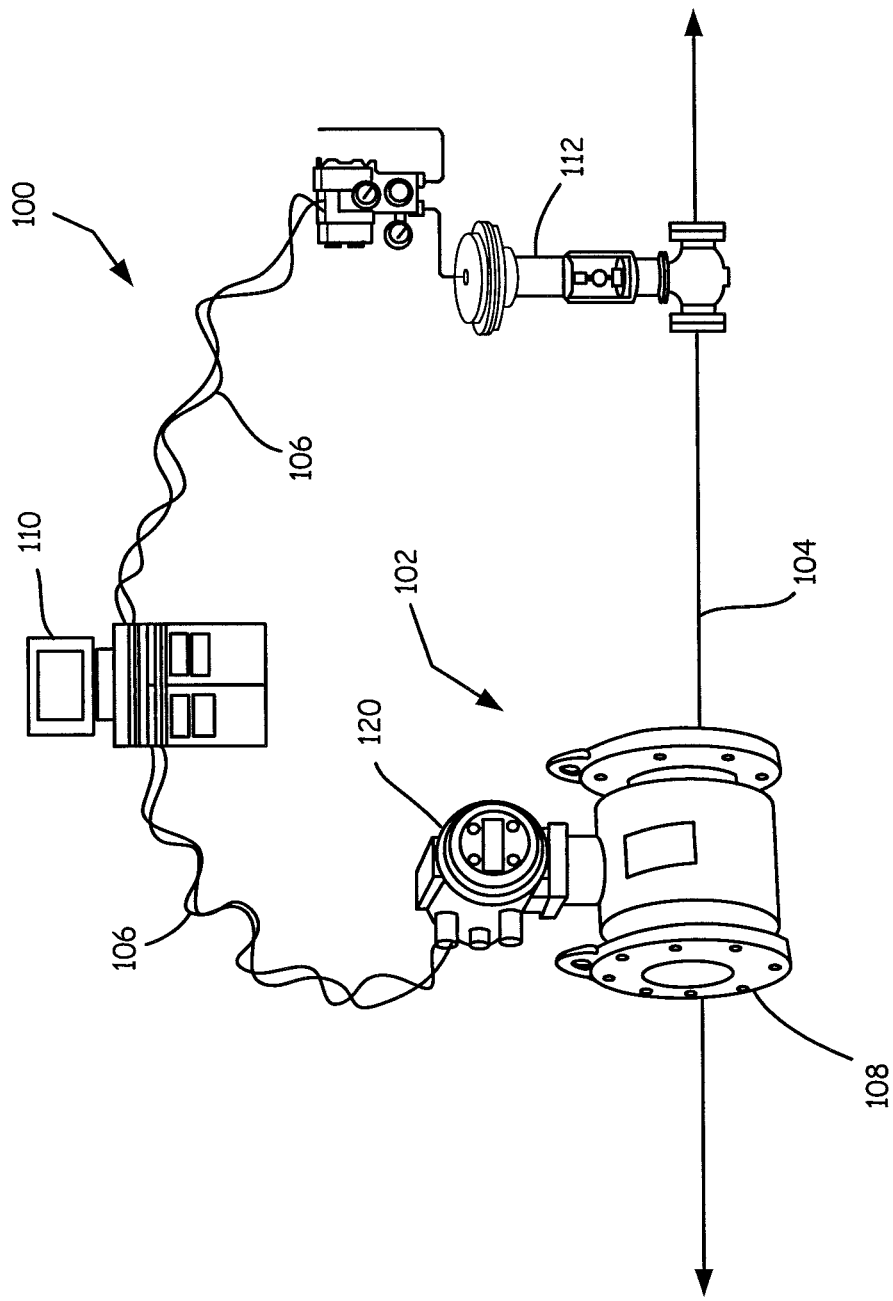
FIG. 1 is a diagrammatic view showing a process control system including a magnetic flowmeter.

FIG. 1 illustrates a typical environment 100 for magnetic flowmeter 102. Magnetic flowmeter 102 is coupled to process piping, illustrated diagrammatically at line 104, that also couples to control valve 112. Magnetic flowmeter 102 is configured to provide a flow rate output relative to process fluid flow in a process plant. Examples of such process fluids include slurries and liquids in chemicals, pulp, pharmaceutical, food and other fluid processing plants.

Magnetic flowmeter 102 includes electronics housing 120 connected to flowtube 108. Magnetic flowmeter 102 outputs are configured for transmission over long distances to a controller or indicator via process communication bus 106. In typical processing plants, communication bus 106 can be 4-20 mA current loop, a FOUNDATION™ Fieldbus connection, a pulse output/frequency output, a Highway Addressable Remote Transducer (HART®) protocol communication, a wireless communication connection, such as that in accordance with IEC 62591, Ethernet, or a fiber optic connection to a controller such a system controller/monitor 110 or other suitable device. System controller 110 is programmed as a process monitor, to display flow information for a human operator or as a process controller to control the process using control valve 112 over process communication bus 106. While embodiments of the present invention are applicable to all magnetic flowmeters, they are particularly relevant to magnetic flowmeters with relatively small diameter process pipes. With such small flowtubes, it is sometimes difficult to fit the coil shields around the electrode isolation tunnels. Further, small flowtube-magnetic flowmeters may sometimes have elevated coil temperatures, and it is sometimes difficult to maximize magnetic flux passing through the process pipe. Embodiments of the present invention generally use a magnetic core piece that extends transversely from the flowtube and includes a pair of arms that extend laterally to the side sings. In one embodiment, the magnetic core is T-shaped.

Figure 2:
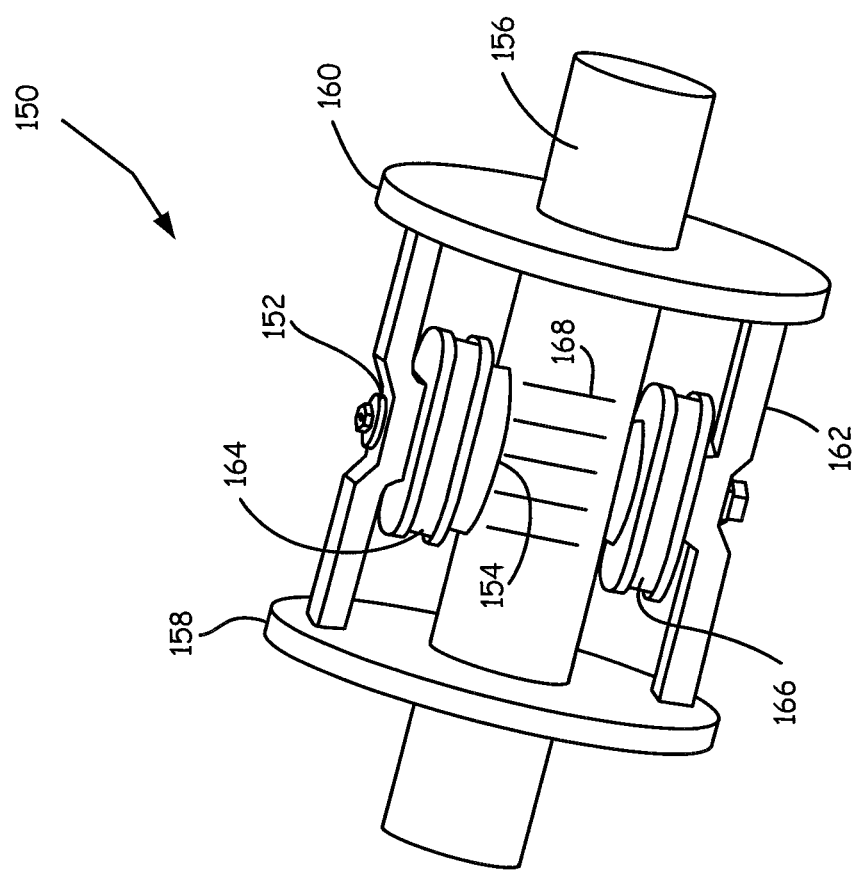
FIG. 2 is a diagrammatic view of a magnetic flowmeter in accordance with an embodiment of the present invention.

FIG. 2 is a diagrammatic view of a magnetic flowmeter having an improved magnetic core in accordance with the embodiment of the present invention. Flowmeter 150 includes T-shaped magnetic core 152 that extends from a substantially centered position 154 on flowtube 156 to each of side rings 158, 160. Additionally, a second T-shaped magnetic core 162 is mounted opposite core 152 on flowtube 156. In this way, current passing through coils 164, 166 generates a magnetic flux as indicated by magnetic flux lines 168. The magnetic flux indicated at reference numeral 168 is considered a primary magnetic flux in that it is the magnetic flux that induces a voltage or EMF across the conductive process fluid in relation to the flow rate of the process fluid. A pair of electrodes (not shown in FIG. 2) contact the process fluid and are used by the magnetic flowmeter circuitry to measure the induced voltage to determine the process fluid flow rate. However, in order to effectively couple the primary magnetic flux through flowtube 156, it is also important to have an efficient magnetic return path. In this regard, the portions of T-shaped magnetic cores 152, 162 that generally extend substantially parallel to flowtube 156 are farmed of a low reluctance core material that minimizes magnetic return path flux leakage. In one embodiment, T-shaped magnetic cores 152, 162 may be formed of steel or magnetically soft materials which exhibit high magnetic permeability, but lower coercivity and hysteresis compared to most steels. However, in other embodiments, each core may be formed of laminations of electrical steel similar to a transformer, in order to minimize the eddy currents and potentially allow the magnetic field to settle faster. Additionally, while embodiments of the present invention show cores 152, 162 as having a T-shape, the important functionality is that a low reluctance path be provided from the winding assembly to the side rings of the flowmeter. Thus, other shapes, such as a Y-shape could also be used in accordance with embodiments of the present invention. One feature of the improved magnetic core configuration is that the magnetic circuit is complete before a wrapper or other metallic housing is mounted over the assembly. In this way, testing and diagnostics of the device can be performed very easily.

Figure 3:
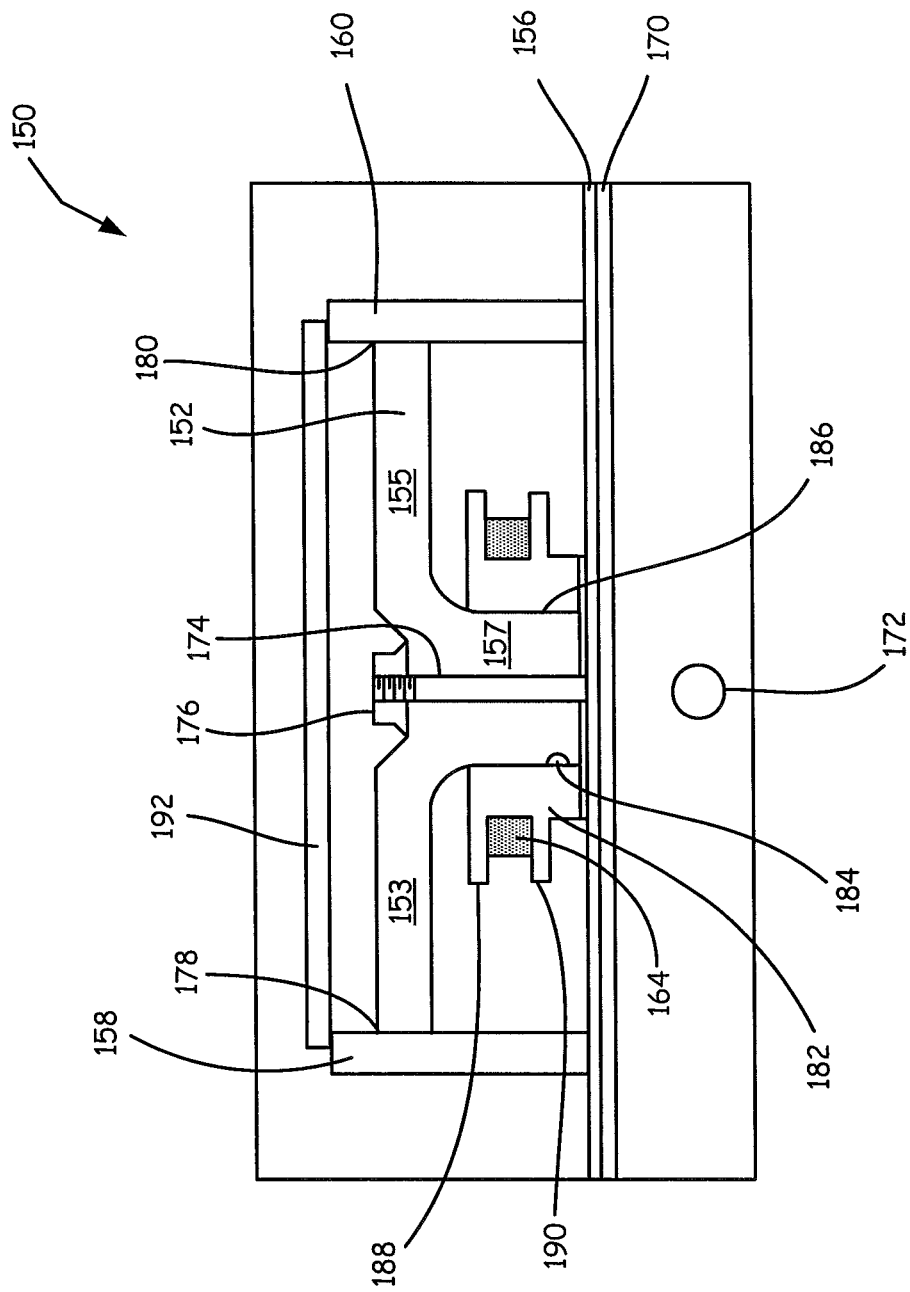
FIG. 3 is a cross sectional view of a magnetic core configuration in accordance with an embodiment of the present invention.

Each of windings 164, 166 is preferably wound about a non-metallic winding spool 182 (shown in greater detail in FIG. 3). In one embodiment, non-metallic winding spool 182 is formed of a moldable plastic. The plastics are preferably moldable and also have a high enough operating temperature that they can function properly in magnetic flowmeter 150.

FIG. 3 is a diagrammatic cross sectional view of a portion of magnetic flowmeter 150 in accordance with an embodiment of the present invention. In FIG. 3, only a portion of the flowtube 156 is shown. As can be seen, an electrically non-conducting interior liner 170 is provided adjacent metallic flowtube 156. Liner 170 ensures that the EMF induced in the process fluid does not reach metallic flowtube, which would short out induced EMF. In embodiments where the flowtube is non-conductive, liner 170 may be omitted. Also shown in FIG. 3, an electrode 172 passes through non-conductive liner 170 and contacts process fluid flowing through flowtube 156. A mounting member, such as a threaded stud 174 is welded, or otherwise affixed, to flowtube 156. T-shaped core 152 includes stem portion 157 extending away from flowtube 156 and having a bore therein sized to receive mounting stud 174 for precisely positioning the core 162 relative to flowtube 156. T-shaped core 152 is clamped or otherwise secured in place by nut 176, which engages the threads of mounting stud 174. Additionally, aims 153, 155 of core 152 are also welded, or otherwise secured, to respective rings 158, 160 at respective interfaces 178, 180.

FIG. 3 illustrates spool 182 having an interior diameter 184 that is sized to pass outside diameter 186 of T-shaped core 152. Magnetic windings 164 are wound around spool 182 between guides 188 and 190. As can be appreciated, once mounting stud 174 is affixed to flowtube 156, assembling the flowtube is relatively straightforward. Specifically, spool 182 can merely be slipped over outside diameter 186 of T-shaped core 152, which may then be mounted or placed upon mounting stud 174. The entire assembly is then fixed in place by tightening nut 176 Finally, T-shaped core 152 is welded to side rings 158, 160 at respective interfaces 178, 180. Once complete, a cover or other suitable housing 192 can be placed over the assembly thereby completing the flowtube.

Embodiments of the present invention are believed to increase the efficiency of flux generation through the flowtube. Specifically, embodiments of the present invention have allowed a reduction in the number of turns for the magnetic spools by 35% and 44% on two prototype flowtubes that have been produced in accordance with embodiments of the present invention while the signal strength has remained the same. Further still, embodiments of the present invention generally reduce the part count on the flowtube design. This is because the T-shaped core and coil spools each serve multiple purposes. The T-shaped core serves as the magnetic core, mounting bracket, and magnetic connection to side rings 158, 160. The coil spool serves as a winding form, electrical insulation, mounting bracket, standoff, and wire guide (which will be described in greater detail below with respect to FIG. 4).

Figure 4:
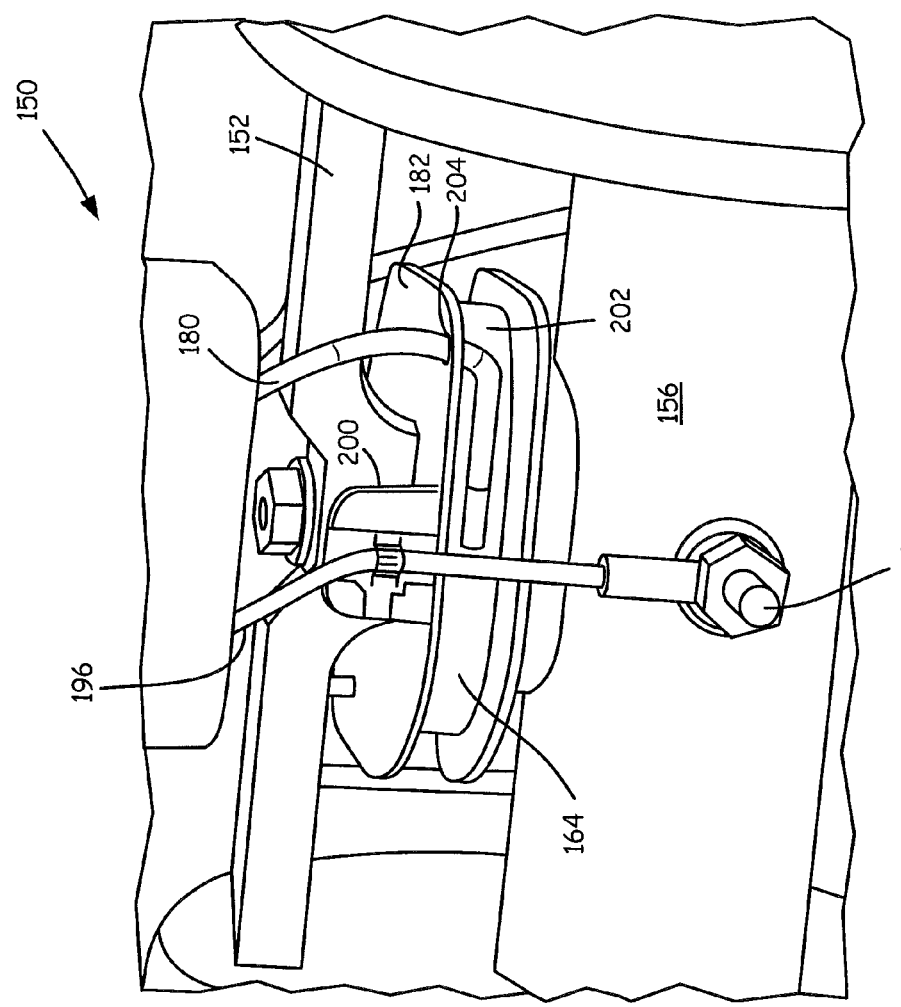
FIG. 4 is a diagrammatic view of a magnetic core configuration in a magnetic flowmeter in accordance with an embodiment of the present invention.

FIG. 4 is a diagrammatic view of a portion of flowtube 150 in accordance with an embodiment of the present invention. FIG. 4 illustrates T-shaped core 152 mounted to flowtube 156 with coil winding spool 182 mounted in place. Additionally, FIG. 4 illustrates one of the electrodes at reference numeral 194. Wires 196 and 198 make respective electrical connections to electrode 194 and coil winding 164. Given the strength of the magnetic field generated by the coil windings, if any of wires 196, 198 should move or otherwise change position, the output signal of the magnetic flowmeter will be affected. Thus, it is very important in the design of flowtube 150 that wires 196, 198 be held securely in place and not be allowed to shift. In this regard, coil winding spool 182 includes a number of features that facilitate securely mounting wires 196, 198 in fixed positions within flowtube 150. For example, electrode wire 196 passes by tab 200 which includes an aperture to which a cable tie or other suitable wire securing device can be snapped or otherwise affixed. This provides positive location of electrode wire 196 with respect to the magnetic field, which is very important to the operation of the magnetic flowmeter. Similarly, wire 198 is bent at location 202 and passes through aperture 204 in guide 188 of spool 182. Thus, coil lead wire 198 is held in a precise location and strain relieved by passing through holes in the coil winding spools. This provides positive location and strain relief for the wires.

Current flowtube designs generally use a steel coil housing as a magnetic return path. However, the steel coil housing prevents any significant testing or troubleshooting of the magnetic circuit until the housing is welded shut. Once welded shut, none of the coil or electrode wiring can be modified to affect any changes. By contrast, embodiments of the present invention provide all major components of the magnetic circuit before the housing is welded shut. This allows testing and troubleshooting to be accomplished with the wiring still accessible such that changes can be made before the housing is welded shut or otherwise sealed.

One of the current challenges for known flowtube designs is that the combination of the heat generated by the magnetic coils and the heat escaping through the flowtube combine to increase the temperature of the coil. This forces a limit on the maximum process and ambient temperatures based on the thermal class rating of the magnetic wire, and/or the safety protection type (hazardous location rating) of the device. By spacing the coil from the flowtube (illustrated at dimension d in FIG. 3) the maximum temperature of the coil can be reduced significantly. In one embodiment, dimension d is approximately 0.35 inches. This significantly reduces the maximum temperature of the coil in two ways. First, the temperature is reduced directly by providing thermal isolation from the flowtube wall. Second, the temperature is also reduced indirectly since by reducing the temperature the coil is exposed to, the resistance of the winding decreases, thereby requiring less power to be dissipated in the field coils. Testing on prototypes built show a 40° C. reduction in coil temperature as compared to known designs where coils are mounted directly on the flowtube. Separating the coils from the flowtube does not significantly reduce the magnetic field in the flowtube because the T-shaped core remains closely mounted to the flowtube.

Although the present invention has been described with reference to preferred embodiments, workers skilled in the art will recognize that changes may be made in form and detail without departing from the spirit and scope of the invention.

What is claimed is:

1. A flowtube assembly for a magnetic flowmeter, the flowtube assembly including:
   a flowtube configured to receive a flow of process fluid therethrough;
   a magnetic core mounted relative to the flowtube, the magnetic core including a stem extending from the flowtube to a pair of arms, each extending away from the stem; and
   a spool having a plurality of magnetic windings, the spool being disposed about the stem and spacing the plurality of windings from the flowtube.

2. The flowtube assembly of claim 1, wherein the magnetic core is T-shaped.

3. The flow tube assembly of claim 1, wherein the magnetic core is Y-shaped.

4. The flowtube assembly of claim 1, and further comprising:
   a second magnetic core mounted on an opposite side of the flowtube from the magnetic core, the second magnetic core including a stem extending from the flowtube to a pair of arms, each extending away from the stem of the second magnetic core; and
   a second spool having a plurality of magnetic windings, the second spool being disposed about the stem of the second magnetic core and spacing the plurality of windings from the flowtube.

5. The flowtube assembly of claim 4, wherein the magnetic cores are identical.

6. The flowtube assembly of claim 4, and further comprising a plurality of electrodes disposed to contact the process fluid flowing through the flowtube.

7. The flowtube assembly of claim 1, and further comprising a pair of side rings mounted to the flowtube, each side ring being positioned proximate to a respective arm of the magnetic core.

8. The flowtube assembly of claim 7, wherein the side rings are welded to the arms.

9. The flowtube assembly of claim 1, wherein the spool is constructed from a non-metallic material.

10. The flowtube assembly of claim 1, wherein the spool comprises a moldable plastic.

11. The flowtube assembly of claim 1, wherein the spool includes at least one feature adapted to maintain a wire in a fixed position.

12. The flowtube assembly of claim 1, wherein the spool spaces the plurality of windings from the flowtube such that spaces the plurality of windings away from the flowtube such that it significantly reduces the operating temperature of the windings.

13. The flowtube assembly of claim 1, wherein the flowtube is metallic and includes a non-conductive interior liner.

14. The flowtube assembly of claim 1, and further comprising a mounting device attached to the flowtube, and wherein the stem of the magnetic core is cooperatively engaged with the mounting device.

15. The flowtube assembly of claim 14, wherein the mounting device is a mounting stud affixed to the flowtube, and wherein the stem is clamped onto the mounting stud by a nut.

16. The flowtube assembly of claim 14, wherein the spool is clamped by the magnetic core.

17. The flowtube assembly of claim 15, wherein the flowtube is metallic and wherein the mounting stud is welded to the flowtube.

* * * * *